United States Patent
Wang et al.

(10) Patent No.: US 12,466,753 B2
(45) Date of Patent: Nov. 11, 2025

(54) FLUIDIZED BED SEPARATION METHOD AND DEVICE FOR METHANOL-TO-OLEFINS QUENCHED WATER

(71) Applicants: EAST CHINA UNIVERSITY OF SCIENCE AND TECHNOLOGY, Shanghai (CN); SHANGHAI HUACHANG ENVIRONMENTAL PROTECTION CO., LTD, Shanghai (CN); SINOPEC GUANGZHOU ENGINEERING CO., LTD., Guangdong (CN)

(72) Inventors: Hualin Wang, Shanghai (CN); Wenjie Lv, Shanghai (CN); Jiangi Chen, Shanghai (CN); Yu Liu, Guangdong (CN); Lei Shi, Guangdong (CN); Ligong Qiao, Guangdong (CN); Jie Zhang, Guangdong (CN); Guoping Chang, Guangdong (CN); Zhihong Dang, Shanghai (CN); Yujie Ji, Shanghai (CN); Hongpeng Ma, Shanghai (CN); Xin Cui, Shanghai (CN); Weichi Sang, Shanghai (CN); Jinsong Wang, Shanghai (CN)

(73) Assignees: EAST CHINA UNIVERSITY OF SCIENCE AND TECHNOLOGY, Shanghai (CN); SHANGHAI HUACHANG ENVIRONMENTAL PROTECTION CO., LTD., Shanghai (CN); SINOPEC GUANGZHOU ENGINEERING CO., LTD., Guangdong (CN)

(*) Notice: Subject to any disclaimer, the term of this patent is extended or adjusted under 35 U.S.C. 154(b) by 390 days.

(21) Appl. No.: 18/245,575

(22) PCT Filed: Sep. 17, 2020

(86) PCT No.: PCT/CN2020/115849
§ 371 (c)(1),
(2) Date: Mar. 16, 2023

(87) PCT Pub. No.: WO2022/056776
PCT Pub. Date: Mar. 24, 2022

(65) Prior Publication Data
US 2023/0365449 A1    Nov. 16, 2023

(51) Int. Cl.
*C02F 9/00* (2023.01)
*B01D 47/00* (2006.01)
(Continued)

(52) U.S. Cl.
CPC ............... *C02F 9/00* (2013.01); *B01D 47/00* (2013.01); *C02F 1/28* (2013.01); *C02F 1/38* (2013.01);
(Continued)

(58) Field of Classification Search
CPC ...... C02F 9/00; C02F 1/28; C02F 1/38; C02F 11/122; C02F 2103/18; C02F 2303/10;
(Continued)

(56) References Cited

U.S. PATENT DOCUMENTS 6,166,282 A * 12/2000 Miller .................... C10G 11/18
585/641
2004/0064806 A1* 4/2004 Johnston-Watt .... G06F 11/3688
717/124
(Continued)

FOREIGN PATENT DOCUMENTS

CN    101352620 A    1/2009
CN    101568614 A  * 10/2009 ............... C07C 1/20
(Continued)

OTHER PUBLICATIONS

English translation of publication CN101519265A, Oct. 28, 2009. (Year: 2009).*
(Continued)

*Primary Examiner* — Joseph W Drodge
(74) *Attorney, Agent, or Firm* — Marshall & Melhorn, LLC

(57) ABSTRACT

Disclosed are a fluidized bed separation method and device for methanol-to-olefins quenched water. The method may subject quenched water to liquid-solid separation via a micro-cyclone separator. The method may also subject clear liquid from the micro-cyclone separator to a secondary separation via a fluidized bed separator, then sending the
(Continued)

same to an olefin separation device, then recovering some waste heat of the quenched water, and then returning the same to a quenching tower after performing heat exchange. The method may also regenerate a separation medium by reversely feeding stripping tower purified water or quenched water, so as to release catalyst particles absorbed by the separation medium. The method may also send a catalyst slurry concentrated by the micro-cyclone separator and the fluidized bed separator to a filter-press unit for filter-press dehydration, so as to recover a catalyst.

9 Claims, 4 Drawing Sheets

(51) Int. Cl.
*C02F 1/28* (2023.01)
*C02F 1/38* (2023.01)
*C02F 11/12* (2019.01)
*C02F 11/122* (2019.01)
*C02F 103/18* (2006.01)

(52) U.S. Cl.
CPC ......... *C02F 11/122* (2013.01); *C02F 2103/18* (2013.01); *C02F 2303/10* (2013.01); *C02F 2303/16* (2013.01)

(58) Field of Classification Search
CPC ........ C02F 2303/16; C02F 1/004; C02F 1/24; C02F 1/281; C02F 1/40; C02F 3/12; C02F 2103/36; C02F 1/16; C02F 2209/02; C02F 2209/03; C02F 2209/105; C02F 2209/40; C02F 2301/026; C02F 2301/046; C02F 2301/066; C02F 2303/24; C02F 1/20; C02F 2101/32; C02F 1/006; C02F 2001/007; C02F 2201/005; C02F 2209/005; C02F 2103/365; C02F 2103/38; B01D 47/00; B01D 45/12; B01D 47/021; B01D 50/00; B01D 17/0205; B01D 17/045; C07C 1/20; C07C 11/04; C07C 11/06; C07C 1/26; Y02P 20/50; Y02P 30/20; Y02P 30/40

See application file for complete search history.

(56) References Cited

U.S. PATENT DOCUMENTS

| | | | |
|---|---|---|---|
| 2004/0192992 A1* | 9/2004 | Van Egmond | C07C 7/00 585/639 |
| 2005/0027752 A1* | 2/2005 | Gelbard | G06Q 10/10 |
| 2005/0203326 A1* | 9/2005 | Miller | B01J 8/006 585/800 |
| 2008/0146434 A1* | 6/2008 | Corradi | C07C 1/20 502/21 |
| 2021/0024829 A1* | 1/2021 | Magrini | C10B 49/10 |

FOREIGN PATENT DOCUMENTS

| | | | | |
|---|---|---|---|---|
| CN | 102093153 A | | 6/2011 | |
| CN | 103951098 A | | 7/2014 | |
| CN | 203820559 U | * | 9/2014 | ............. Y02P 30/40 |
| CN | 107382654 A | | 11/2017 | |
| CN | 207330792 U | | 5/2018 | |
| CN | 108117179 A | * | 6/2018 | ............. C02F 1/001 |
| CN | 108328761 A | * | 7/2018 | ............. C02F 9/00 |
| CN | 110980981 A | * | 4/2020 | ............. C02F 9/00 |
| CN | 111072438 A | * | 4/2020 | ............. C07C 7/04 |
| WO | 2015063250 A1 | | 5/2015 | |

OTHER PUBLICATIONS

English translation of publication CN203820559U, Sep. 10, 2014. (Year: 2014).*
English translation of publication CN108117179A, Jun. 6, 2018. (Year: 2018).*
English translation of publication CN108328761, Jul. 27, 2018. (Year: 2018).*
English translation of publication CN11090981, Apr. 20, 2020. (Year: 2020).*
English translation of publication CN111072438, Apr. 28, 2020. (Year: 2020).*
China National Intellectual Property Administration, International Search Report and Written Opinion in Application No. PCT/CN2020/115849, dated Jun. 17, 2021, 9 pages, Beijing, China.

* cited by examiner

FLUIDIZED BED SEPARATION METHOD AND DEVICE FOR METHANOL-TO-OLEFINS QUENCHED WATER

TECHNICAL FIELD

The present disclosure pertains to the field of comprehensive treatment of environmental pollution, and relates to a method for purifying methanol-to-olefins quench water, suitable for removing and concentrating particles in the methanol-to-olefins quench water. In particular, the present disclosure provides a fluidized bed based separation method and a fluidized bed based separation device for methanol-to-olefins quench water, and a comprehensive treatment method for recovering waste liquid, waste gas, and residual heat of supernate of quench water generated during regeneration of the separation device.

BACKGROUND ART

Manufacture of olefins from methanol, referred to as MTO (Methanol to Olefins), refers to a process for preparation of low-carbon olefins by catalytic reaction using methanol as a raw material. The reaction is generally implemented in a fluidized bed reactor, and the catalyst currently used is SAPO-34 molecular sieve. A portion of the catalyst particles are entrained in the reaction product gas. At present, the catalyst is recovered with a three-stage or four-stage cyclone separator. The product gas from which the catalyst has been recovered is sent to a quench tower for cooling. Due to the limited separation accuracy of the cyclone separator, the product gas from which the catalyst has been recovered still contains a small amount of fine catalyst powder having a particle diameter of less than 10 μm or less than 5 μm. After washing in the quench tower, most of the fine catalyst powder remains in the quench water, and a small amount of it goes with the gas phase to a subsequent water washing tower. Therefore, in order to guarantee normal operation of the water system, it is necessary to effectively remove the particulate matter in the quench water.

At present, the common methods for removing solids from wastewater mainly include physical methods, chemical methods, and physical-chemical methods. The physical methods mainly include gravity method, centrifugal separation method, precision filtration method, membrane separation method, etc. The gravity method has poor separation accuracy, and cannot remove fine particles from quench water. The separating effect is poor when the centrifugal separation method is used to separate particles having a particle diameter of less than 5 μm. Because the particles in the MTO quench water have a small particle diameter, they can easily enter the channels of the filter element of a precision filtration device, clog the channels, and can hardly be removed by online backwashing. The membrane separation method is widely used in recent years due to its excellent separating effect, but it has the disadvantages of easy blockage, high maintenance fee and high cost due to the high solid content of MTO quench water. The chemical methods mainly include flocculation method, electrochemical method, etc. The flocculation method has a poor treatment effect on fine particles. In addition, the treatment agents are expensive, and it is easy to produce secondary pollution. The electroflocculation method needs to consume a large quantity of auxiliary salt reagents and electricity, and the operating cost is high. The physical-chemical methods mainly include air flotation method, adsorption method, coagulation method, etc. The air flotation method needs to consume chemicals, and needs a large footprint. The adsorbent used in the adsorption method has a limited adsorption capacity and a high cost, and its regeneration is difficult. The coagulation method is simple in operation, and needs a small footprint, but a coagulant needs to be added, and the cost is high.

Chinese Patent Application For Invention CN101352621A discloses a method and a device for removing solids from MTO quench water and washing water by cyclone, wherein a microcyclone separator is used to remove the catalyst entrained in the quench water. Due to the limited separation accuracy of the cyclone separator, this method has a poor separating effect on particles below 2.5 μm in practical application, such that fine particles cannot be removed effectively, and accumulate in the system. FIG. 1 shows the changes in the content and particle diameter of the suspensions in the quench water of a methanol-to-olefins device according to the prior art. As shown in FIG. 1, along with the continuous operation of the system, the average particle diameter of the catalyst in the quench water decreases from 10 μm to 1 μm. At the same time, its overall concentration rises significantly, indicating that the accumulation of fine particles in the system is serious. Since the small particles cannot be removed effectively, the quench water heat exchanger and air cooler are clogged badly, and the heat exchange efficiency is insufficient.

Chinese Patent Application For Invention CN101352620A discloses a method and a device for microcyclone concentration of fine catalyst in MTO quench water and washing water. Chinese Patent For Invention CN102093153B discloses a method and a device for optimized combination of purification and separation of MTO reaction gas containing fine catalyst powder. Both of the above methods use a multi-stage hydrocyclone separator to purify and concentrate the catalyst in the quench water and washing water. However, due to the separation nature of the hydrocyclone itself, the concentration ratio of the catalyst below 2.5 μm is insufficient.

In order to solve the problem of the insufficient separation efficiency for particles below 2.5 μm, a sintered metal mesh precision filter device is usually added before the supernate in the cyclone separator is returned to the tower to remove small particles and reduce the solid content of the quench water. Chinese Patent Application For Invention CN104649446A discloses a method and a device for liquid-solid separation of MTO quench water and washing water, wherein precision filtration is adopted to separate and concentrate the catalyst in the quench water. However, in the practical operation, due to the small particle diameter of the particles in the quench water and the presence of a small amount of oil/wax, the particles and oil/wax can easily enter the channels of the filter element, clog the channels, and can hardly be removed by online backwashing, resulting in an insufficient filter capacity and an excessive pressure difference, so that the device cannot work normally.

Chinese Patent For Utility Model CN205031975U discloses a device for purification and treatment of MTO quench water and washing water. A microporous filter element is used in the device for filtration. Cleaning and regeneration of the filter element are implemented by introducing effective gas backflushing and using a chemical cleaning method. However, the backwashing process of this system is complicated and time-consuming. Additionally, the equipment investment is large, and the operating cost is high.

Chinese Patent For Invention CN103951098B discloses a method and a device for removing solids and oil from quench water and washing water in a methanol-to-olefins process. An ultrafiltration membrane is used in the method to separate the catalyst from the quench water. The separating effect of the method is good, but the energy consumption of the device is high, and the operating cost is also high. In addition, among other problems, the ultrafiltration membrane is susceptible to blockage by oil/wax. Hence, it is not suitable for MTO quench water which contains complex components and needs a large treatment capacity.

In summary, the requirements for treating highly concentrated methanol-to-olefins waste water containing solids cannot be satisfied by the traditional physical methods due to the high cost or poor treatment effect, or by the traditional chemical methods due to the secondary pollution caused by the consumption of chemicals and the difficulty in recycling water after treatment, or by the traditional physical-chemical methods due to the consumption of chemicals and high operating cost. Therefore, there is an urgent need for a simple and effective treatment process to address the poor separating effect of the existing methods.

SUMMARY

The present disclosure provides a novel fluidized bed based separation method and a novel fluidized bed based separation device for methanol-to-olefins quench water, thereby solving the problems existing in the prior art.

In one aspect, the present disclosure provides a fluidized bed based separation method for methanol-to-olefins quench water, comprising the following steps:
(a) subjecting quench water to liquid-solid separation by a microcyclone separator to remove large particles entrained in the quench water;
(b) subjecting supernate from the microcyclone separator to secondary separation by a fluidized bed separator to remove residual particles in the quench water which is then sent to a residual heat recovery unit as a low-temperature heat source to recover part of residual heat of the quench water, and then returned to a quench tower after heat exchange;
(c) after a period of time of continuous operation of the fluidized bed separator, regenerating a separating medium in the fluidized bed separator by back-feeding purified water from a stripping tower or the quench water to release catalyst particles adsorbed by the separating medium; and
(d) sending concentrated catalyst slurries from the microcyclone separator and the fluidized bed separator to a pressure filtration unit for dewatering by pressure filtration to recover the catalyst.

In a preferred embodiment, the method further includes the following steps:
(i) removing large catalyst particles from a product gas obtained by reacting a methanol raw material in a fluidized bed reactor, and then sending the product gas to the quench tower for washing and cooling, while washing fine catalyst powder entrained in the product gas into the quench water;
(ii) sending the product gas washed and cooled by the quench tower to a water washing tower for washing, recooling and removal of oil-wax substances condensed in the product gas;
(iii) discharging a portion of washing water obtained after the washing in the water washing tower to the stripping tower for stripping organic matter in the washing water to obtain a striped product, a part of which is subjected to wastewater treatment, and a remaining part of which is used for regeneration of the separating medium in the fluidized bed separator; and
(iv) cooling the quench water obtained in step (i) and the washing water obtained in step (ii) by recovering heat, and reusing them by circulating in the quench tower and the water washing tower, respectively.

In another preferred embodiment, in step (i), a solid particles content of the quench water is 0.1-5.0 g/L, and an average particle diameter of the solid particles is 0.5-50 μm.

In another preferred embodiment, after the liquid-solid separation in step (a), an average particle diameter of the catalyst in the quench water is reduced to 5 μm or less; after the secondary separation in step (b), a catalyst content in the quench water is reduced to 10 mg/L or less; and a separation precision is $D_{85}=0.1$ μm.

In another preferred embodiment, a pressure loss of the microcyclone separator is 0.15-0.30 MPa; and a pressure loss of the fluidized bed separator is 0.02-0.30 MPa.

In another preferred embodiment, the fluidized bed separator is operated in a batch-wise mode, and after it continually works to a set pressure difference, the separating medium is cleaned and regenerated by back-feeding the purified water from the stripping tower or the quench water, and further, nitrogen or steam to the fluidized bed separator to fluidize the separating medium to an ebullient state.

In another aspect, the present disclosure provides a fluidized bed based separation device for methanol-to-olefins quench water, comprising:
a microcyclone separator in communication with a quench tower for liquid-solid separation of quench water to remove large particles entrained in the quench water;
a fluidized bed separator in communication with the microcyclone separator for secondary separation of supernate from the microcyclone separator to remove residual particles in the quench water which is then sent to a residual heat recovery unit as a low-temperature heat source to recover part of residual heat of the quench water, and then returned to the quench tower after heat exchange; and
a pressure filtration unit in communication with the fluidized bed separator for dewatering concentrated catalyst slurries from the microcyclone separator and the fluidized bed separator by pressure filtration to recover the catalyst.

In a preferred embodiment, the device further comprises:
a fluidized bed reactor for reacting a methanol raw material therein;
the quench tower in communication with the fluidized bed reactor for washing and cooling a product gas obtained by the reaction in the fluidized bed reactor after large catalyst particles are removed, while washing fine catalyst powder entrained in the product gas into the quench water;
a water washing tower in communication with the quench tower for washing and recooling the product gas washed and cooled by the quench tower, and removing oil-wax substances condensed in the product gas; and
a stripping tower in communication with the water washing tower for stripping a portion of washing water obtained by the washing in the water washing tower;
wherein the stripping tower is communicated with the fluidized bed separator, and water for regeneration of a separating medium in the fluidized bed separator is purified water from the stripping tower.

In another preferred embodiment, the device further comprises a residual heat recovery unit in communication with the fluidized bed separator for recovering heat from supernate of the quench water which is cooled for reuse.

In another preferred embodiment, one or more granular separating media are used in the fluidized bed separator, wherein a material of the separating medium is an organic or inorganic material capable of adsorbing molecular sieve catalyst particles; and a three-phase cyclone separator is disposed at a top of the fluidized bed separator to form a cyclone field to enhance a regeneration effect of the separating medium, and, at the same time, achieve recovery of medium particles during the regeneration by fluidization.

Beneficial Effects:

1) The method according to the present disclosure combines the microcyclone separation process and the granular bed filtration process in series, which addresses the problem of the insufficient separation efficiency of the original microcyclone separator set for particles smaller than 5 μm, and overcomes the deficiency of the insufficient separation capacity of the granular bed in the fluidized bed separator for wastewater with a high solids content at the same time. These two separation processes complement each other. Meanwhile, the comprehensive treatment of the waste liquid and waste gas generated in the regeneration of the purification device and the recovery of the residual heat from the supernate of the quench water are achieved, so as to realize near zero discharge of the pollutants, near zero landfill of the waste, and effective utilization of the heat.

2) The method according to the present disclosure utilizes the granular bed in the fluidized bed separator to purify the quench water overflowing from the cyclone separator, and makes use of the functions of the separating medium in screening, intercepting, and adsorbing the particles in the water to reduce the particles content in the water gradually with the depth of the filter layer. Compared with precision filtration, this method needs simple equipment, low investment, easy regeneration of separating medium, low energy consumption and low maintenance fee.

3) The method according to the present disclosure uses a fluidized bed process to regenerate the separating medium, and enhances the regeneration effect of the separating medium by forming a cyclone field with a top cyclone separation device. At the same time, recovery of the medium particles is achieved during the regeneration by fluidization. Compared with a traditional granular bed process, the method according to the present disclosure has the advantages of higher regeneration capacity and better regeneration effect, suitable for the separation of MTO quench water catalyst with strong adhesion and oily wax substance.

DESCRIPTION OF THE DRAWINGS

The accompanying drawings are provided for further understanding of the disclosure. They constitute a part of the specification only for further explanation of the disclosure without limiting the disclosure.

Figure 1:
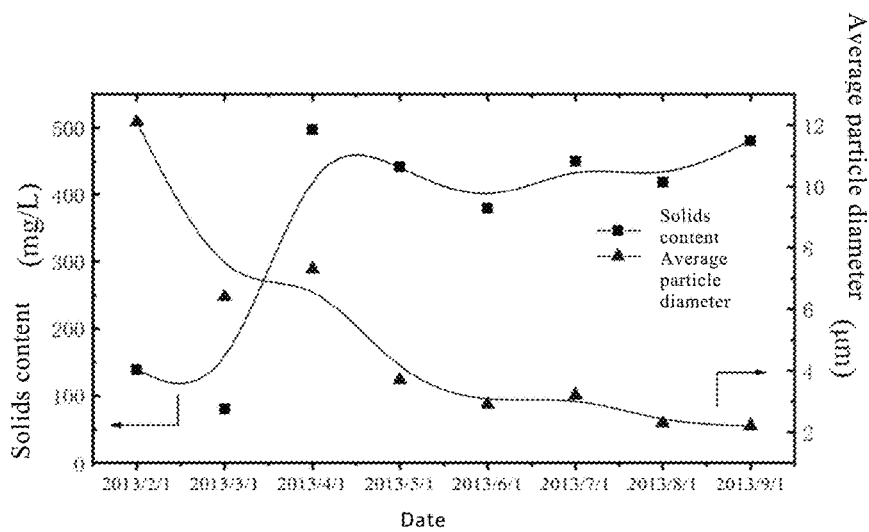
FIG. 1 shows changes of the content and particle diameter of the suspended matter in the quench water of a methanol-to-olefins device according to the prior art.

The reference numbers in the figures are described as follows:

1-1. Fluidized bed reactor; 1-2. Regenerator; 1-3. Quench tower; 1-4. Microcyclone separator; 1-5. Fluidized bed separator; 1-6. Water washing tower; 1-7. Stripping tower; 1-8. Pressure filtration unit; 1-9. Residual heat recovery unit;

2-1. Oil trap; 2-2. Air flotation pool; 2-3. Biochemical unit; 2-4. Aerated biological filtration pool; 2-5. Sand filtration unit;

3-1. Inlet valve; 3-2. Outlet valve; 3-3. Drain valve; 3-4. Exhaust valve; 3-5. Access valve; 3-6. Backwash valve; 3-7. Buffer settling tank; 3-8. Cyclone deliquoring tank;

4-1. Housing; 4-2. Granular bed; 4-3. Partition plate; 4-4. Strainer; 4-5. Feed distributor; 4-6. Vortex breaker; 4-7. Three-phase cyclone separator.

DETAILED DESCRIPTION

Based on the study on the microscopic movement of fine particles, the regulation of the structural alignment, the regularity of particle aggregation and the regulation of the mechanism of capture of the microdispersed phase by the particles, the inventors of the present application have developed the fluidized bed separation technology, wherein the collision and adsorption functions of the separating medium, and the high-precision interception function of the microchannels formed by the separating medium are utilized to effectively remove the fine particles and some oily organic substances in the washing water. The microchannel separation is different from the membrane separation. Because the microchannels are not fixed, include long passages and have a large capacity for pollutants, the problem of blockage by pollutants can be avoided effectively. For a liquid-solid system having a large operating flow rate and containing small-sized particles such as the quench water from a methanol-to-olefins apparatus, the most cost-effective method for separation is one that uses a microcyclone separator set. However, it's found in practical applications that the separating effect of this method is not good for particles smaller than 2 μm in quench water. Usually, a sintered metal mesh precision filter device is connected in series to the microcyclone separator set downstream thereof. The precision filter device fulfils filtration by cake filtration. Because the solid particles in the quench water have a small particle diameter and contain some oil/wax, the filter cake formed from the solid particles is extremely dense and has poor water permeability. After the filter case is formed, the filtration pressure difference rises quickly. At the same time, because the catalyst in the quench water has a wide particle size distribution and includes some particles smaller than 0.5 µm, it can enter the channels of the filter element readily during filtration, causing blockage of the channels. In addition, it's difficult to remove these particles by a simple backwashing process. In order to solve the problems of this system, a method combining a microcyclone separator and a fluidized bed separator is used to separate the catalyst particles in the quench water from a methanol-to-olefins apparatus. By using a fluidized bed separator and a microcyclone separator in combination, this method not only solves the problem of the insufficient separation efficiency of the original microcyclone separator set for particles smaller than 2 µm, but also overcomes the deficiency of the insufficient separation capacity of the granular bed filtration method for wastewater with a high solids content. At the same time, the deficiencies of the original precision filtration method, such as rapid rise in pressure difference and incomplete backwashing, can be avoided. Compared with the precision filtration method, this method needs lower equipment cost and lower energy consumption, and runs more reliably. The process combining microcyclone separation and fluidized bed separation is expected to effectively solve the problems of incomplete separation, easy blockage, frequent equipment cleaning, and short continuous operation cycle found in the existing methanol-to-olefins quench water circulation system.

The technical concept of the present invention is as follows:

The water from the bottom of the quench tower is pre-separated by the microcyclone separator to remove large submicron-sized particles; the quench water purified by the microcyclone separator is subjected to secondary separation by the fluidized bed separator to remove the remaining nanoparticles, and then returned to the quench water circulation system; and the catalyst slurries recovered from the microcyclone separator and the fluidized bed separator are sent to the pressure filtration unit for dewatering by pressure filtration. This method realizes deep removal of nano-/micro-particles in quench water and recycling of water. The concentration of suspensions in the effluent is reduced to 10 mg/L or less, and the cleaning frequency of the heat exchanger and air cooler in the system can be reduced by 90%.

In a first aspect according to the present disclosure, there is provided a fluidized bed based separation method for methanol-to-olefins quench water, comprising the following steps:
(i) removing large catalyst particles from a product gas obtained by reacting a methanol raw material in a fluidized bed reactor, and then sending the product gas to the quench tower for washing and cooling, while washing fine catalyst powder entrained in the product gas into the quench water;
(ii) sending the product gas washed and cooled by the quench tower to a water washing tower for washing, recooling and removal of oil-wax substances condensed in the product gas;
(iii) discharging a portion of washing water obtained after the washing in the water washing tower to the stripping tower for stripping organic matter in the washing water to obtain a striped product, a part of which is subjected to wastewater treatment, and a remaining part of which is used for regeneration of a separating medium in a fluidized bed separator;
(iv) cooling the quench water obtained in step (i) and the washing water obtained in step (ii) by recovering heat, and reusing them by circulating in the quench tower and the water washing tower, respectively;
(v) subjecting the quench water obtained in step (i) to liquid-solid separation by a microcyclone separator to remove large particles entrained in the quench water;
(vi) subjecting supernate from the microcyclone separator to secondary separation by the fluidized bed separator to remove residual particles in the quench water which is then sent to a residual heat recovery unit as a low-temperature heat source to recover part of residual heat of the quench water, and then returned to the quench tower after heat exchange;
(vii) after a period of time of continuous operation of the fluidized bed separator, regenerating the separating medium by back-feeding purified water from the stripping tower or the quench water to release catalyst particles adsorbed by the separating medium; and
(viii) sending concentrated catalyst slurries from the microcyclone separator and the fluidized bed separator to a pressure filtration unit for dewatering by pressure filtration to recover the catalyst.

In the present disclosure, in step (i), the working temperature of the quench water is 95-115° C.; and the solid particles are a fine powder of the methanol-to-olefins catalyst, usually broken SAPO-34 molecular sieve, having a content of 0.1-5.0 g/L, preferably 0.1-1.0 g/L, and an average particle diameter of 0.5-50 µm, preferably 1-20 µm.

In the present disclosure, the purification method includes two separation processes, namely microcyclone separation and granular bed filtration, and these two separation processes are combined in series to achieve staged removal of the catalyst in the quench water.

In the present disclosure, after the microcyclone separation in step (v), the average particle diameter of the catalyst in the quench water is reduced to 5 µm or less, preferably 2.5 µm or less.

In the present disclosure, after the fluidized bed separation in step (vi), the catalyst content in the quench water is reduced to 10 mg/L or less, and the separation accuracy is $D_{85}=0.1$ µm.

In the present disclosure, the pressure loss of the microcyclone separator is 0.15-0.30 MPa, and the pressure loss of the fluidized bed separator is 0.02-0.30 MPa.

In the present disclosure, the fluidized bed separator is operated in a batch-wise mode, and after it continually works to a set pressure difference (e.g., pressure difference ≥0.2 MPa), the separating medium is cleaned and regenerated by back-feeding the purified water from the stripping tower or the quench water to the fluidized bed separator to fluidize the separating medium to an ebullient state. A certain amount of nitrogen or steam can also be fed at the same time to enhance the effect of regeneration by fluidization.

In the present disclosure, if the wear loss of the catalyst in the system is small and the equilibrium concentration of the catalyst in the quench water is low, the fluidized bed separator may be used alone, not operated in series with the microcyclone separator.

In a second aspect according to the present disclosure, there is provided a fluidized bed based separation device for methanol-to-olefins quench water, comprising:
a fluidized bed reactor for reacting a methanol raw material therein;
a quench tower in communication with the fluidized bed reactor for washing and cooling a product gas obtained in the fluidized bed reactor after large catalyst particles are removed, while washing fine catalyst powder entrained in the product gas into the quench water;

a water washing tower in communication with the quench tower for washing and recooling the product gas washed and cooled by the quench tower, and removing oil-wax substances condensed in the product gas;

a stripping tower in communication with the water washing tower for stripping a portion of washing water obtained by the washing in the water washing tower;

a fluidized bed separator in communication with the stripping tower, wherein water for regeneration of a separating medium in the fluidized bed separator is purified water from the stripping tower;

a microcyclone separator in communication with the quench tower and the fluidized bed separator respectively for liquid-solid separation of the quench water to remove large particles entrained therein, wherein supernate from the microcyclone separator is sent into the fluidized bed separator for secondary separation.

In the present disclosure, the device further comprises a residual heat recovery unit in communication with the quench tower for recovering heat from supernate of the quench water, wherein the supernate is reused after it's cooled.

In the present disclosure, one or more granular separating media are used in the fluidized bed separator, wherein the material of the separating medium is an organic or inorganic material capable of adsorbing molecular sieve catalyst particles.

In the present disclosure, one or more granular separating media are used in the fluidized bed separator, wherein the material is an organic or inorganic material capable of adsorbing molecular sieve catalyst particles. The separating medium may be a particulate separating medium such as quartz sand, anthracite, fruit shell, activated carbon, carbon spheres or ceramic spheres, or a combination of various separating media. By the functions of the separating medium in screening, intercepting, and adsorbing the particles in the water, the particles content in the water is reduced gradually with the depth of the filter layer, such that the quench water is purified.

In the present disclosure, a three-phase cyclone separator is disposed at the top of the fluidized bed separator to form a cyclone field to enhance the regeneration effect of the separating medium, and, at the same time, achieve recovery of medium particles during the regeneration by fluidization.

Preferably, the fluidized bed based separation device for methanol-to-olefins quench water according to the present disclosure can be extended to various occasions in need of heterogeneous separation where fine particles are entrained in liquid.

Reference will be now made to the accompanying drawings.

Figure 2:
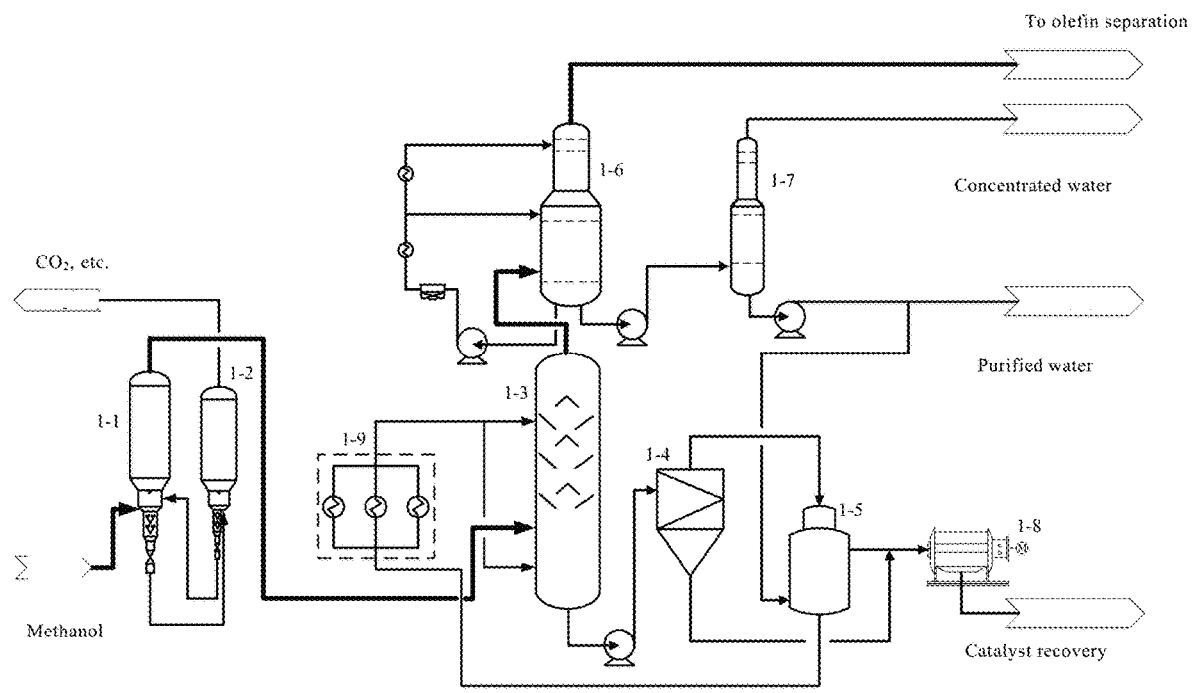
FIG. 2 is a schematic view showing an overall process flow of the method for purifying the methanol-to-olefins quench water in a preferred embodiment according to the present disclosure.

FIG. 2 is a schematic view showing an overall process flow of the method for purifying the methanol-to-olefins quench water in a preferred embodiment according to the present disclosure. As shown in FIG. 2, the reactant methanol is heated and then sent to a fluidized bed reactor 1-1. After the reaction, the catalyst is sent to a regenerator 1-2 for regeneration by burning of the coke (the regenerated catalyst is returned to the fluidized bed reactor, and the exhaust gas such as $CO_2$ is discharged). The product gas passes through a multi-stage cyclone separator to recover catalyst particles, and then it is sent to a quench tower 1-3. Part of the fine catalyst powder that has a particle diameter of less than 10 microns enters the quench tower 1-3 along with the product gas. It is cooled by quenching and then goes to a water washing tower 1-6. The combinatorial system for purifying quench water mainly consists of a microcyclone separator 1-4 and a fluidized bed separator 1-5. The quench water is sent to the microcyclone separator 1-4 by a centrifugal pump under pressure for primary purification of the quench water to remove large particles in the water. The underflow turbid liquid in the microcyclone separator is sent to a pressure filtration unit 1-8 for dewatering by pressure filtration, and the catalyst is recovered. The overflow supernate is sent to the fluidized bed separator 1-5. The overflow supernate in the microcyclone separator is purified again by the fluidized bed separator to remove the remaining particulate matter, and then sent to a residual heat recovery unit 1-9 as a low-temperature heat source to recover part of the residual heat of the quench water. After heat exchange, it is returned to the quench tower. The product gas washed and cooled in the quench tower is sent to the water washing tower for washing and cooling again, and the oil/wax substances condensed in the product gas are washed away (to olefins separation). A portion of the washing water is discharged to a stripping tower 1-7 to strip the organic matter in the washing water. Then, the purified water is sent to a sewage treatment plant, while a portion of it is used for regeneration of the separating medium in the fluidized bed separator. The concentrated water is discharged. After the fluidized bed separator runs continuously for a period of time, the separating medium is regenerated by back-feeding the purified water from the stripping tower to release the catalyst particles adsorbed on the separating medium.

Figure 3:
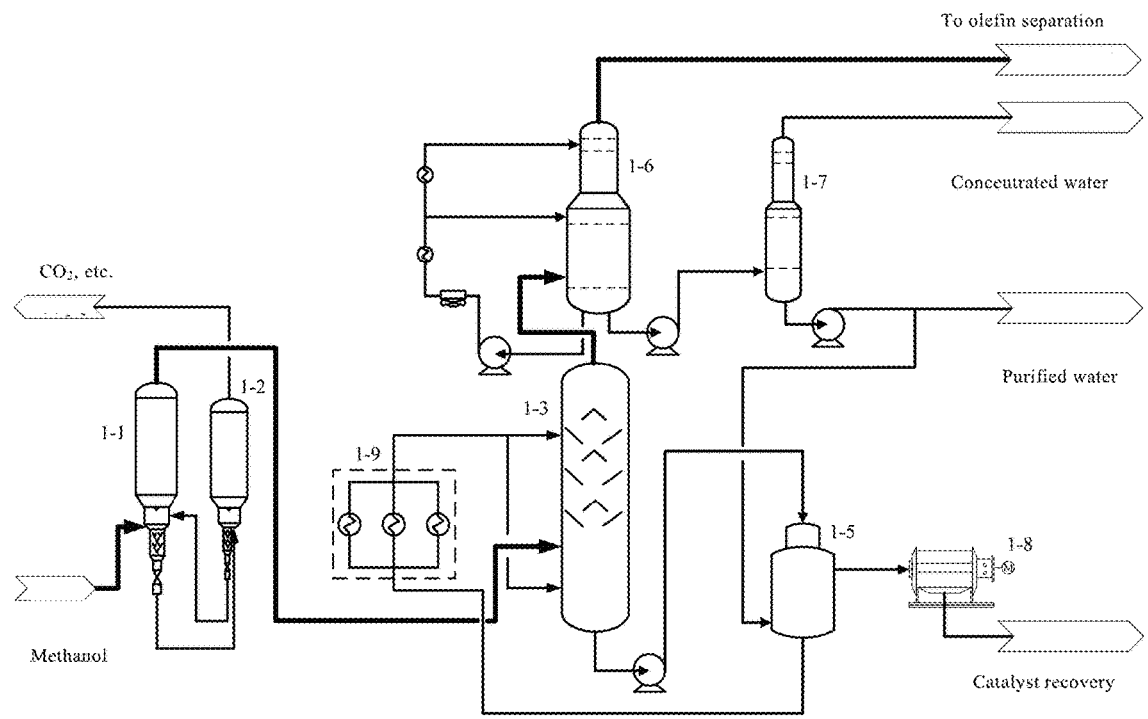
FIG. 3 is a schematic view showing an overall process flow of the method for purifying the methanol-to-olefins quench water in another preferred embodiment according to the present disclosure.

FIG. 3 is a schematic view showing an overall process flow of the method for purifying the methanol-to-olefins quench water in another preferred embodiment according to the present disclosure. This embodiment is suitable for an MTO apparatus where the wear loss of the catalyst is small, and the equilibrium concentration of the catalyst in the quench water is low (<500 mg/L). As shown in FIG. 3, in contrast to the embodiment shown in FIG. 2, the microcyclone separator 1-4 is left out in this embodiment, and only the fluidized bed separator 1-5 is used to purify the quench water. The rest of the flow process is the same that in FIG. 2.

Figure 4:
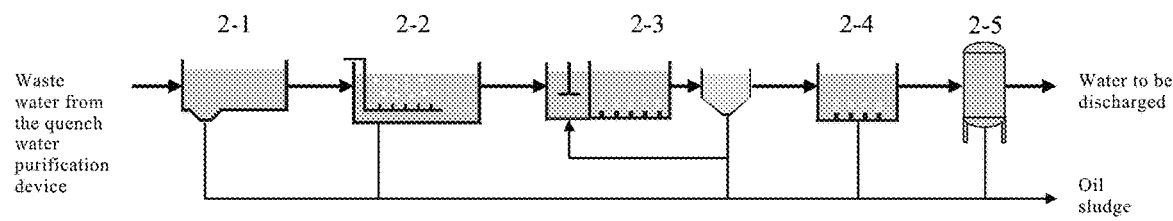
FIG. 4 is a schematic view showing a processing flow for discharging waste water from a quench water purification device to a sewage treatment plant in a preferred embodiment according to the present disclosure.

FIG. 4 is a schematic view showing a processing flow for discharging waste water from a quench water purification device to a sewage treatment plant in a preferred embodiment according to the present disclosure. As shown in FIG. 4, the waste water from the quench water purification device is mainly generated by the catalyst pressure filtration unit. The average flow is 3 t/h. The wastewater is first sent to an oil trap 2-1 in which the suspended matter and oil/fat are initially separated from the wastewater by way of the difference of the suspended matter, oil and water in specific gravity. The wastewater treated by the oil trap 2-1 is sent to an air flotation pool 2-2 in which the suspended floccules and small oil droplets in the wastewater further flocculate and grow, and combine with the bubbles released by the aerated water to form large floccules that rise to the water surface under the action of buoyancy and rising water, thereby further separating the oil and solids in the wastewater. After the air flotation treatment, the waste water is sent to a biochemical unit 2-3 in which COD (chemical oxygen demand) substances, ammonia nitrogen, oil/fat and the like are removed from the wastewater by microbial degradation. Then, the wastewater is sent to an aerated biological filtration pool 2-4 in which the COD substances, ammonia nitrogen, oil/fat, suspended matter and the like are further removed from the wastewater by means of the oxidative degradation function of the biofilm on the surface of the filter material and the interception function of the filter material in the filter tank. Finally, the wastewater is sent to a sand filtration unit 2-5 for deep removal of the suspended matter from the wastewater, and then the water is drained or reused. Sludge is discharged from the bottoms of the oil trap 2-1, the air flotation pool 2-2, the biochemical unit 2-3, the aerated biological filtration pool 2-4 and the sand filtration unit 2-5.

Figure 5:
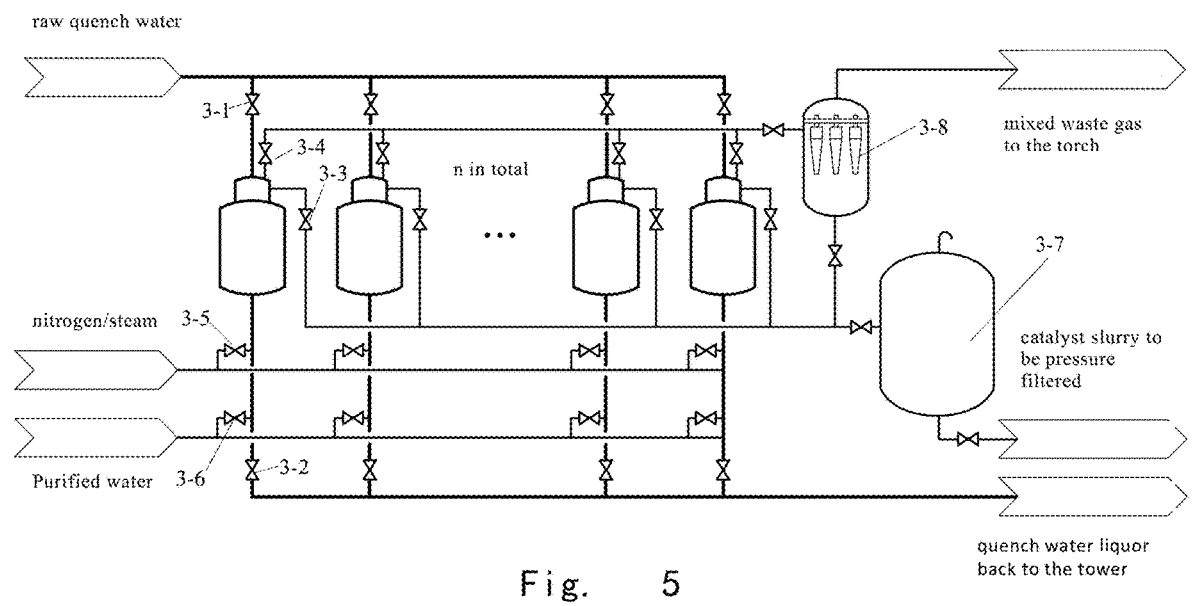
FIG. 5 is a schematic view showing a process flow of a fluidized bed separation system in a preferred embodiment according to the present disclosure.

FIG. 5 is a schematic view showing a process flow of a fluidized bed separation system in a preferred embodiment according to the present disclosure. As shown in FIG. 5, the fluidized bed separation system may include a plurality of fluidized bed separators operating in parallel (a total number of n, wherein n≥2). During normal operation, the raw quench water is fed from the top inlets of the equipment, and the purified quench water is discharged from the bottom outlets. The purified quench water is returned to the quench tower (the supernate of the quench water is returned to the tower). When the equipment runs continuously until the pressure difference rises to a preset value, the separators are switched to backwash operation in turn. During backwashing, the inlet valve 3-1 and outlet valve 3-2 of the equipment are closed, and the drain valve 3-3, exhaust valve 3-4, nitrogen/steam access valve 3-5 and backwash valve 3-6 are opened. The purified water and nitrogen/steam are used to bring the granular bed in the separator to an ebullient state, so that the pollutants intercepted and adsorbed in the granular bed are released, thereby achieving regeneration of the separating medium. The pollutant catalyst slurry produced in the regeneration is discharged from the drain port and sent to a buffer settling tank 3-7. After settling, the catalyst slurry at the bottom is sent to a pressure filtration unit for pressure filtration treatment (catalyst slurry to pressure filtration) to recover the catalyst, thereby achieving near-zero landfill of waste. The waste water containing trace oil and solids produced by the pressure filtration unit is discharged to a sewage treatment plant. After the organic matter and suspended matter are removed from the waste water, the water up to the standard is discharged to the environment or reused. The mixed waste gas is discharged from the exhaust port, and sent to a torch unit (mixed waste gas to torch) after the water in it is removed by a cyclone deliquoring tank 3-8, thereby achieving near-zero emission of pollutants.

Figure 6:
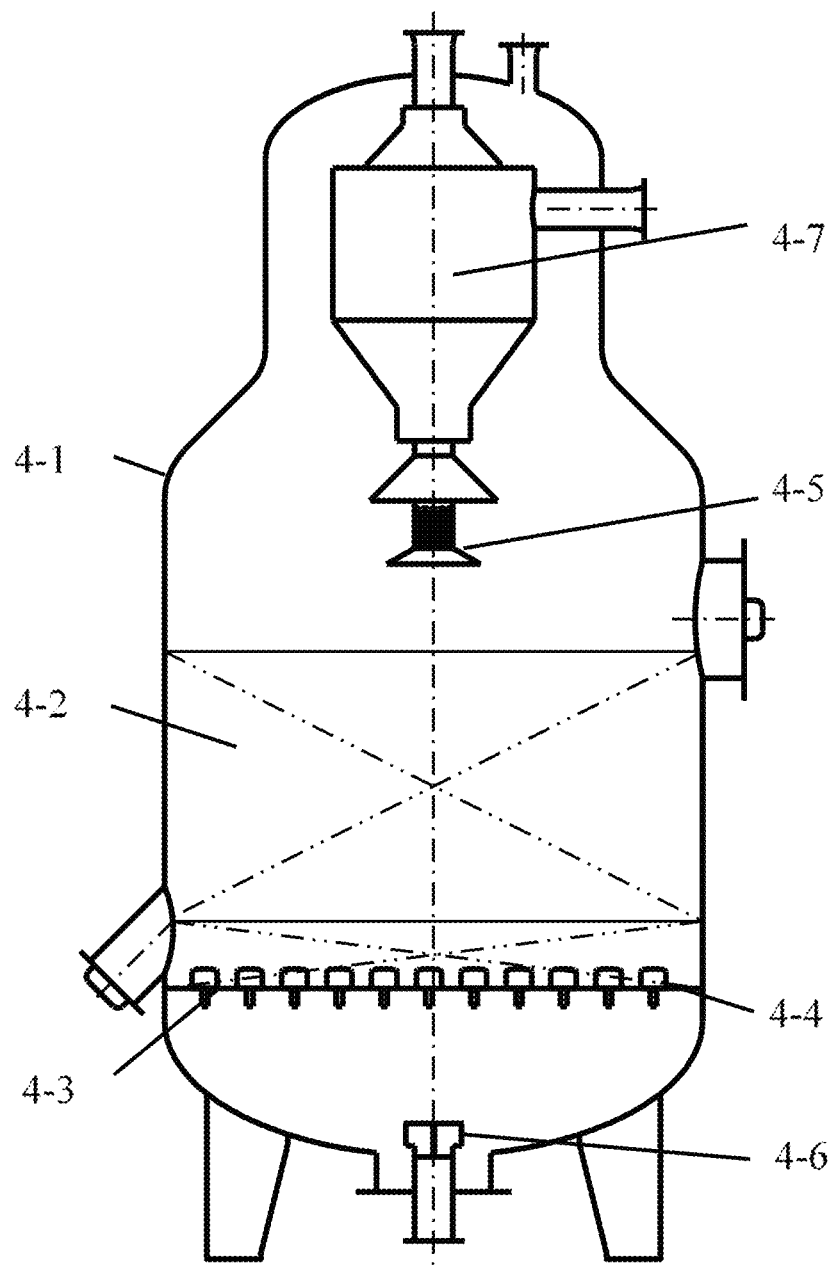
FIG. 6 is a schematic view showing a fluidized bed separator device in a preferred embodiment according to the present disclosure.

FIG. 6 is a schematic view showing a fluidized bed separator device in a preferred embodiment according to the present disclosure. As shown in FIG. 6, the fluidized bed separator mainly comprises a housing 4-1, a granular bed 4-2, a partition plate 4-3, a strainer 4-4, a feed distributor 4-5, a vortex breaker 4-6, and a three-phase cyclone separator 4-7, among other parts. During normal operation, the quench water enters the equipment from a top inlet pipe, and is sent to the granular bed through the feed distributor. After separation by the granular bed, the quench water passes through the strainer on the partition plate, passes through the vortex breaker, and is sent to a subsequent processing unit from the bottom outlet. After the equipment is switched to backwash operation, the quench water is fed from the bottom instead, and nitrogen is mixed into the quench water at the same time. The quench water passes through the granular bed from bottom to top to bring the bed into an ebullient state. The pollutants in the separating medium are released, so that the medium is regenerated. The separating medium and pollutants pass through the three-phase cyclone separator at the top of the fluidized bed separator, so that the medium particles are washed in the cyclone field, regeneration of the medium is strengthened, and the medium particles are recovered at the same time. The pollutants are discharged from the drain port at the side surface of the equipment along with the liquid phase, and nitrogen is discharged from the exhaust port at the top.

EXAMPLES

The present disclosure will be further illustrated with reference to the following specific Examples. It is nevertheless to be appreciated that these Examples are only intended to exemplify the present disclosure without limiting the scope of the present disclosure. The test methods in the following examples for which no specific conditions are indicated will be carried out generally under conventional conditions or under those conditions suggested by the manufacturers. Unless otherwise specified, all parts are parts by weight, and all percentages are percentages by weight.

Example 1

In a 1.8 million tons/year methanol-to-olefins process, a fluidized bed based small-scale experimental separation device was used according to the method of the present disclosure to conduct a sideline test on quench water containing a solid catalyst. The specific operation process and effects are described as follows:

For the 1.8 million tons/year methanol-to-olefins process under study, the main measures taken according to the prior art include separating fine particles from the quench water by a microcyclone separator, discharging the quench water continuously at a flow rate of 60 t/h, and replenishing fresh water to balance the solids content in the quench water. Although such measures can alleviate the blockage of the methanol-to-olefins water system, the water consumption is large, and the economy is poor. In addition, the load of the downstream sewage treatment is increased, and the heat of the discharged wastewater is difficult to be used. For example, if the quench water is discharged at 110° C., when it is cooled to ambient temperature of 25° C., the heat loss of 1 ton of wastewater is about 360 MJ. If the quench water is discharged at 60 t/h, the daily heat loss is 518400 MJ, equivalent to 17.7 tons of standard coal/day. Therefore, the measures adopted currently are disadvantageous in terms of safety, environmental protection and economy.

1. Material Properties and Related Parameters

The methanol-to-olefins quench water was a liquid-solid two-phase mixture, and the water contained solid catalyst particles and oil, wherein the water was a continuous phase, and the oil and solid catalyst were dispersed phase media. The treatment capacity of the experimental device was 50 L/h. Under the operation state, the density of the liquid phase was 915.4 kg/m$^3$; and the viscosity was 0.255 cP. The operating temperature was 109° C. The content of the spent catalyst was 450 mg/L; and the average particle diameter was 2.0 μm. The oil content was 15 mg/L.

2. Quench Water Purification Device

The device was a single fluidized bed separator having a diameter of 72 mm. The separating medium was modified quartz sand having a particle diameter of 1-2 mm. The height of the granular bed was 1000 mm. The treatment capacity of the single filter was 50 L/h.

3. Implementation Process

The methanol-to-olefins quench water containing fine catalyst powder was sent to the fluidized bed based experimental separation device. After passing through the granular bed, the particulate matter in the water was removed. After continuous operation until the pressure difference rose to 0.3 MPa, the operation was switched to the backwash mode.

4. Result Analysis

After the separation and purification by the fluidized bed, the solids content of the quench water dropped from 450 mg/L to no more than 30 mg/L; the removal rate exceeded 90%; and the average pressure drop of the fluidized bed separator was 0.05 MPa. During the test, after 1000 hours of continuous operation and 100 regeneration operations by backwashing, the ultra-high primary separating effect could still be maintained, and the separation efficiency exceeded 90%.

Example 2

In a 1.8 million tons/year methanol-to-olefins process, a separation device combining a microcyclone separator and a fluidized bed separator was used according to the method of the present disclosure to purify quench water containing a solid catalyst with an aim to separate the spent catalyst microparticles in the quench water effectively. The specific operation process and effects are described as follows:

1. Material Properties and Related Parameters

The methanol-to-olefins quench water was a liquid-solid two-phase mixture, and the water contained solid catalyst particles and oil, wherein the water was a continuous phase, and the oil and solid catalyst were dispersed phase media. The treatment amount of the quench water was 240 t/h. Under the operation state, the density of the liquid phase was 915.4 kg/m$^3$; and the viscosity was 0.255 cP. The operating temperature was 109° C. The content of the spent catalyst was 450 mg/L; and the average particle diameter was 2.0 μm. The oil content was 15 mg/L.

2. Quench Water Purification Device

The device mainly consisted of two parts. One part was a microcyclone separator set, wherein each microcyclone separator had an inner diameter of 25 mm and a treatment capacity of 0.8 m$^3$/h, and 300 microcyclone separators were assembled in parallel. The other part was a fluidized bed separator set, wherein the separating medium was modified quartz sand having a particle diameter of 1-2 mm; the granular bed had a height of 1400 mm; each filter had a treatment capacity of 50 m$^3$/h; 6 fluidized bed separators were used in parallel, 5 on and 1 standby; and they were switched in turn for backwashing.

3. Implementation Process

The methanol-to-olefins quench water containing catalyst fine powder was subjected to liquid-solid separation through the microcyclone separator set to remove large particles in the water. The quench water primarily purified by the microcyclone separator set was then sent to the fluidized bed separator set to remove the remaining particulate matter in the water. The water was then returned to the quench tower. The fluidized bed separator set included 6 fluidized bed separators working in parallel, 5 on and 1 standby. After running continuously until the pressure difference rose to 0.3 MPa, they were switched in turn for backwashing. The dense phase from the microcyclone separators and the backwashing liquid from the fluidized bed separators were sent to a pressure filtration unit for dewatering treatment by pressure filtration to recover the catalyst.

4. Result Analysis

After the combined purification by microcyclone separation and fluidized bed separation, the solid content of the quench water was reduced from 450 mg/L to no more than 10 mg/L; the removal rate exceeded 95%; the pressure drop of the microcyclone separator set in operation was 0.25 MPa; and the average pressure drop of the fluidized bed separators in operation was 0.05 MPa.

In recent years, microcyclone separation, metal membrane separation, ceramic membrane separation and bag filtration have been gradually applied in the purification process of methanol-to-olefins quench water. Based on domestic field research, the inventors of the present application have discovered that the above methods all have certain deficiencies. Thus, the purification of methanol-to-olefins quench water has always been a big challenge that is difficult to be addressed in the MTO industry. Microcyclones and metal membranes are employed in more than 10 sets of MTO equipment. These two devices are generally operated in series, wherein the microcyclone is used for primary separation, and the metal membrane is used for deep purification. The separation precision of the microcyclone separator is low. It only shows a good separating effect on particles larger than 3 microns, and it has difficulty in separating particles smaller than 3 microns. Due to the problem of membrane fouling in metal membrane microfiltration, the membrane flux will be reduced to 20% or less of the normal membrane flux within one month of operation, rendering it difficult to operate normally. Ceramic membranes and bag filters are added in technical transformation in some MTO plants. Ceramic membranes are effective in filtering fine particles in methanol-to-olefins quench water, but the equipment cost is high, and the pressure across the membrane is high. In addition, the problem of membrane channel blockage will gradually arise after more than one year of operation. Currently, ceramic membranes are used in 3 sets of MTO equipment for quench water purification. Due to the low separation precision and short life of the bag filtration method, the treatment efficiency will be significantly reduced after one year of operation, and this problem needs to be solved by replacing the filter bag. This method is used in only one MTO plant.

Compared with the technologies that have been applied, the fluidized bed separation technology is second only to the ceramic membrane separation technology in terms of separation efficiency. Nevertheless, the fluidized bed separation technology is based on the principle of deep filtration, and the filtration channels are formed by accumulation of loose filter material particles. As a result, the channels are variable. In principle, the problem of fouling and clogging of metal membranes or ceramic membranes is avoided. The granular bed of the filter material has a large porosity, and the particles to be filtered can be accommodated in the voids between the filter material particles. Hence, the pollutant holding capacity of the granular bed is large, and the granular bed needs to be backwashed notably less frequently than the surface filtration methods such as metal membrane filtration and ceramic membrane filtration. On the other hand, since the channels are variable, the pollutants retained in the channels can be released easily. In addition, cyclone is introduced to strengthen the flushing, so the pollutants can be easily detached from the surface of the filter material. Therefore, the filter material can be regenerated more effectively than a traditional deep filtration device. Additionally, since the filter material can be selected from traditional quartz sand, anthracite, carbon spheres and the like which are cheap in price, the equipment investment and maintenance fee are very low.

A comparison of several methanol-to-olefins quench water treatment technologies in industrial applications (based on a treatment capacity of 200 m$^3$/h) is shown in Table 1 below. The fluidized bed separation technology is superior to the other technologies in terms of equipment investment, handling expenses, operating costs, sewage discharge frequency, and separation energy consumption. Its separation efficiency is second only to that of the ceramic membrane technology and is sufficient for separation of fine catalyst particles in an MTO quench water system. Nonetheless, it needs a larger space than the other technologies. A comprehensive assessment shows that the fluidized bed separation technology has excellent performance in purification of MTO quench water, so it is more suitable for industrial treatment of MTO quench water.

TABLE 1

Comparison of different MTO quench water purification technologies

| Technology name | Fluidized bed separation | Microcyclone separation | Metal membrane | Ceramic membrane | Bag filtration |
| --- | --- | --- | --- | --- | --- |
| Separation efficiency (%) | 90-99 | 20-60 | 95-99 | >99 | 30-60 |
| Pressure drop (MPa) | 0.2-0.3 | 0.2-0.3 | 0.2-0.5 | 0.3-0.6 | 0.2-0.5 |
| Footprint (m$^2$) | 70-80 | 30-40 | 35-45 | 35-45 | 35-45 |
| Water recycling rate (%) | 98 | 95 | Unable to operate normally | 90 | 90 |
| Backwash cycle (h) | 24-96 | No backwash | <1 | 2-8 | 3-5 |
| Equipment investment (million dollars) | 0.8-1.0 | 0.6-0.8 | 1.5-1.8 | 2.2-2.8 | 1.4-1.7 |
| Maintenance fee (thousand dollars) | 8-12 | 8-12 | Unable to operate normally | 500-1000 | 100-120 |

According to the present disclosure, the method in which a microcyclone separator and a fluidized bed separator are combined is used to remove solids from the methanol-to-olefins quench water. In cooperation with the backwash design of the fluidized bed, the separating medium particles are regenerated to such an extent that the amount of the pollutants trapped therein is reduced to almost zero. The following requirements are well satisfied: the solids content in quench water should be reduced to 30 mg/L or less, and the residual rate of dust after backwashing should be reduced to 5% or less. The requirements of high removal efficiency, long operation cycle, easy maintenance and stable operation of downstream equipment are also satisfied. At the same time, recycling of water, further concentration and recovery of the catalyst, harmless treatment of the waste gas produced in the regeneration process, and partial recovery of the residual heat of the quench water are realized. As such, the comprehensive treatment of the methanol-to-olefins quench water is fulfilled. Moreover, the original 60 t/h quench water discharge can be eliminated. In the case that the quench water is used as a low-temperature heat source in the olefin separation unit to recover part of the residual heat, assuming that the quench water is discharged at 110° C., when it is cooled to 65° C. due to the residual heat recovery, the heat recovered is about 189 MJ per ton of wastewater. Based on discharge of the quench water at 60 t/h, 272160 MJ of heat per day can be saved, equivalent to 9.3 tons of standard coal per day. In addition, the quench water containing solids and a trace amount of oil is discharged to a sewage treatment plant at a flow rate of 60 t/h according to the prior art, and thus the cost of sewage treatment is increased. Now, according the present disclosure, the wastewater discharged to the sewage treatment plant is mainly produced by the pressure filtration unit for the catalyst and contains a trace amount of oil and solids, and the average discharge is 3 t/h. Assuming that the treatment cost is 5 Yuan per ton of water, 2.28 million Yuan/year can be saved for treatment of the quench water discharged.

According to the present disclosure, not only the separation precision is improved, but the shortcomings of rapid rise in pressure difference and incomplete backwashing that the existing precision filtration method suffers from are also avoided. The method according to the present disclosure has lower equipment cost and energy consumption than the precision filtration method.

The Examples listed above are only preferred examples in the disclosure, and they are not intended to limit the scope of the disclosure. Equivalent variations and modifications according to the disclosure in the scope of the present application for invention all fall in the technical scope of the disclosure.

All of the documents mentioned in the disclosure are incorporated herein by reference, as if each of them were incorporated herein individually by reference. It is to be further understood that various changes or modifications to the disclosure can be made by those skilled in the art after reading the above teachings of the disclosure, and these equivalent variations fall in the scope defined by the accompanying claims of the application as well.

What is claimed is:
1. A fluidized bed based separation method for methanol-to-olefins quench water, comprising the following steps:
   (a) subjecting quench water from a quench tower to liquid-solid separation by a microcyclone separator to remove large particles of catalyst entrained in the quench water;
   (b) subjecting supernate from the microcyclone separator to secondary separation by a fluidized bed separator to remove residual particles in the quench water which is then sent to an olefin separation device as a low-temperature heat source to recover part of residual heat of the quench water, and then returned to the quench tower after heat exchange;
   (c) after a period of time of continuous operation of the fluidized bed separator, regenerating a separating medium in the fluidized bed separator by back-feeding purified water from a stripping tower or the quench water to release catalyst particles adsorbed by the separating medium, wherein the stripping tower is communicated with the fluidized bed separator; and
   (d) sending concentrated catalyst slurries from the microcyclone separator and the fluidized bed separator to a pressure filtration unit for dewatering by pressure filtration to recover the catalyst.
2. The method of claim 1, wherein the method further comprises the following steps:
   (i) removing large catalyst particles from a product gas obtained by reacting a methanol raw material in a fluidized bed reactor, and then sending the product gas to the quench tower for washing and cooling, while washing fine catalyst powder entrained in the product gas into the quench water;

(ii) sending the product gas washed and cooled by the quench tower to a water washing tower for washing, recooling and removal of oil-wax substances condensed in the product gas;

(iii) discharging a portion of washing water obtained after the washing in the water washing tower to the stripping tower for stripping organic matter in the washing water to obtain a stripped product, a part of which is subjected to wastewater treatment, and a remaining part of which is used for regeneration of the separating medium in the fluidized bed separator; and (iv) cooling the quench water and the washing water by recovering heat, and reusing them by circulating in the quench tower and the water washing tower, respectively.

3. The method of claim 2, wherein in step (i), a solid particles content of the quench water is 0.1-5.0 g/L, and an average particle diameter of the solid particles is 0.5-50 μm, before being subjected to the liquid-solid separation.

4. The method of claim 1, wherein after the liquid-solid separation in step (a), an average particle diameter of the catalyst in the quench water is reduced to 5 μm or less; after the secondary separation in step (b), a catalyst content in the quench water is reduced to 10 mg/L or less; and a separation precision of the fluidized bed separator is $D_{85}$=0.1 μm.

5. The method of claim 1, wherein a pressure loss of the microcyclone separator is 0.15-0.30 MPa; and a pressure loss of the fluidized bed separator is 0.02-0.30 MPa.

6. The method of claim 1, wherein the fluidized bed separator is operated at a set pressure difference, and the separating medium is cleaned and regenerated by further introducing nitrogen or steam to the fluidized bed separator to fluidize the separating medium to an ebullient state.

7. A fluidized bed based separation device for methanol-to-olefins quench water, comprising:
a quench tower,
a microcyclone separator in communication with the quench tower for liquid-solid separation of quench water to remove large particles entrained in the quench water;
a fluidized bed separator in communication with the microcyclone separator for secondary separation of supernate from the microcyclone separator to remove residual particles in the quench water;
an olefin separation unit as a low-temperature heat source which receives the quench water; and
a pressure filtration unit in communication with the fluidized bed separator for dewatering concentrated catalyst slurries separated from the microcyclone separator and the catalyst slurries concentrated from the fluidized bed separator by pressure filtration to recover the catalyst,
wherein the device further comprises:
a fluidized bed reactor for reacting a methanol raw material therein;
the quench tower in communication with the fluidized bed reactor for washing and cooling a product gas obtained by the reaction in the fluidized bed reactor after large catalyst particles are removed, while washing fine catalyst powder entrained in the product gas into the quench water;
a water washing tower in communication with the quench tower for washing and recooling the product gas washed and cooled by the quench tower, and removing oil-wax substances condensed in the product gas; and
a stripping tower in communication with the water washing tower for stripping a portion of washing water obtained by the washing in the water washing tower;
wherein the stripping tower is communicated with the fluidized bed separator, and water for regeneration of a separating medium in the fluidized bed separator is purified water from the stripping tower.

8. The device of claim 7, wherein the device further comprises a residual heat recovery unit in communication with the fluidized bed separator for recovering heat from supernate of the quench water which is cooled for reuse.

9. The device of claim 7, wherein one or more granular separation media are in the fluidized bed separator, wherein a material of the separation media is an organic or inorganic material capable of adsorbing molecular sieve catalyst particles; and a three-phase cyclone separator is disposed at a top of the fluidized bed separator to form a cyclone field to enhance a regeneration effect of the separating medium, and, at the same time, achieve recovery of separation media particles during a regeneration by fluidization.

* * * * *